Aug. 15, 1950     E. E. WEMP     2,518,735
COUPLING FOR TORQUE TRANSMISSION
Filed Nov. 29, 1944     2 Sheets-Sheet 1
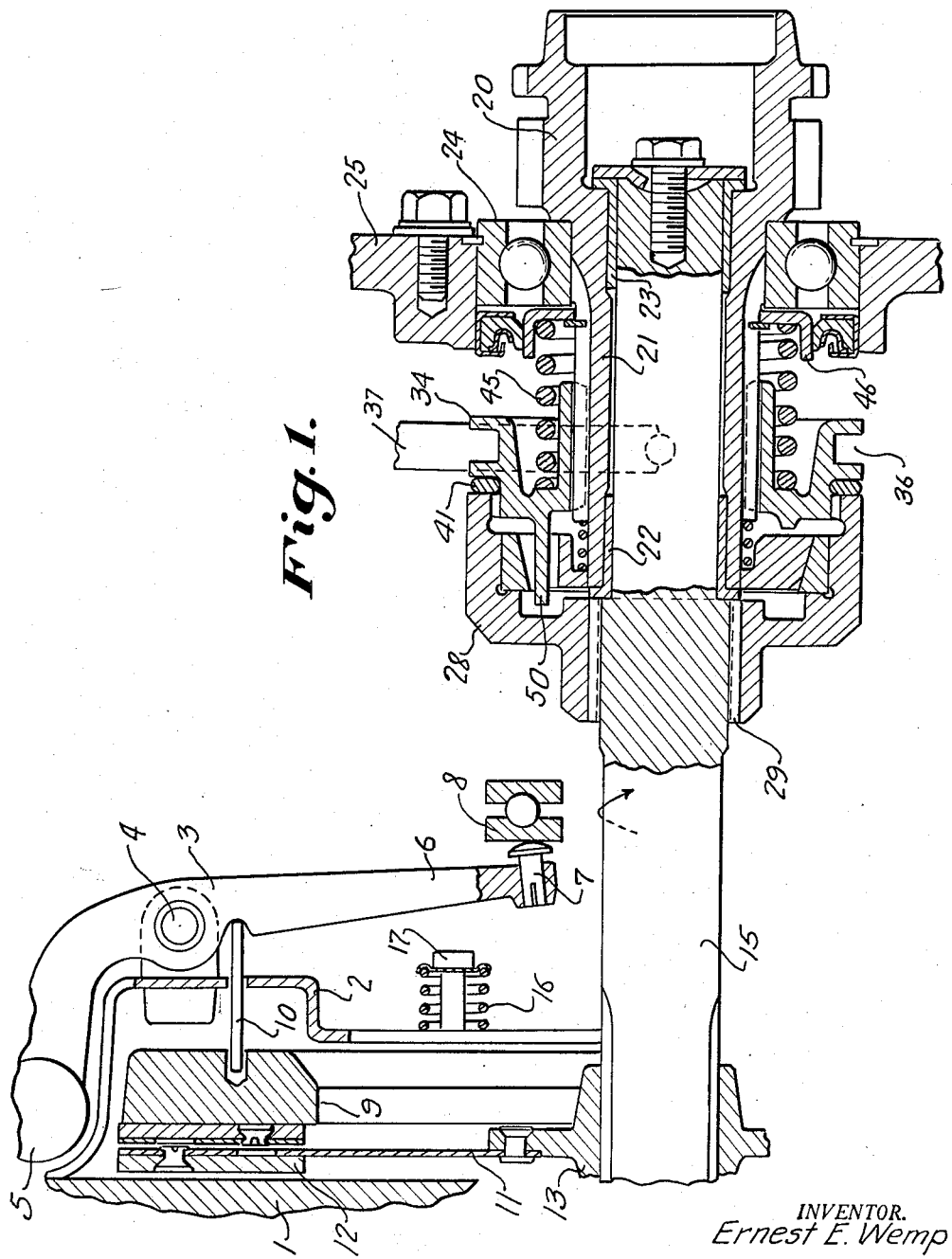
INVENTOR.
Ernest E. Wemp Aug. 15, 1950   E. E. WEMP   2,518,735
COUPLING FOR TORQUE TRANSMISSION
Filed Nov. 29, 1944   2 Sheets-Sheet 2
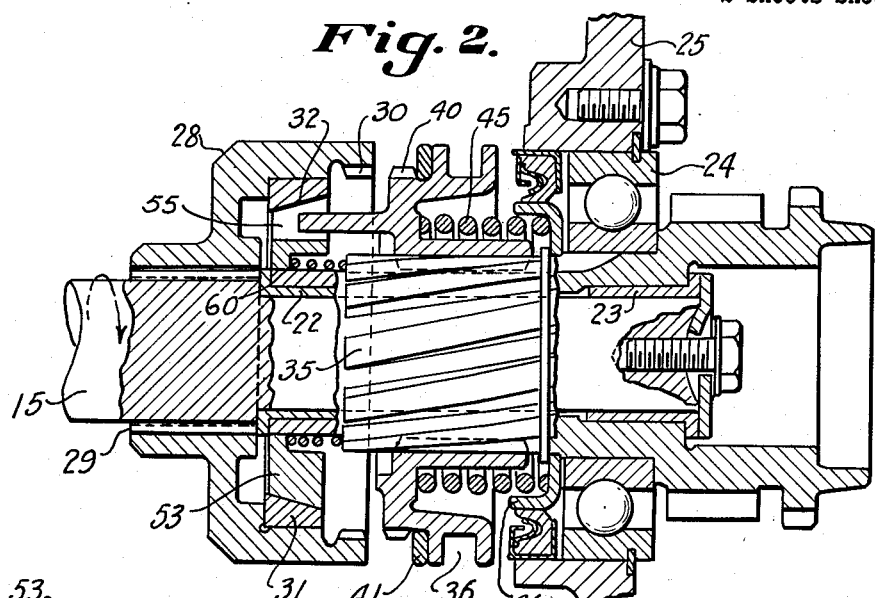
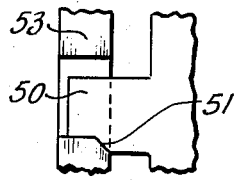
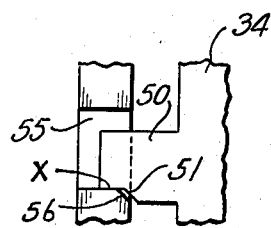
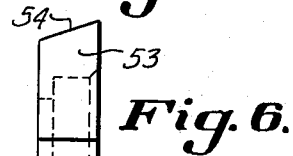
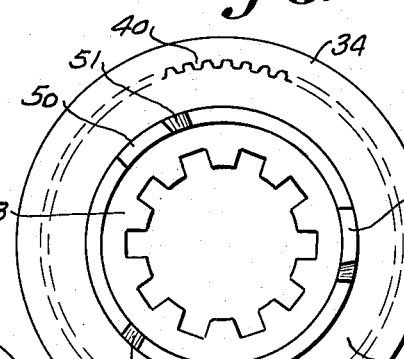
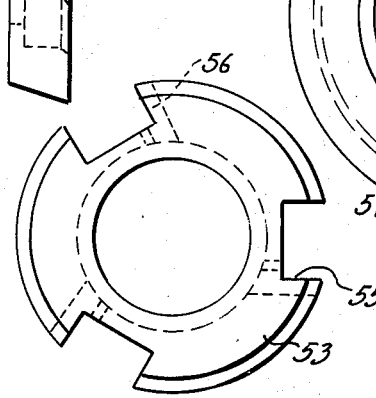
INVENTOR.
Ernest E. Wemp
BY
Barnes, Kisselle, Laughlin & Rausch
Attorneys Patented Aug. 15, 1950

2,518,735

UNITED STATES PATENT OFFICE 2,518,735

COUPLING FOR TORQUE TRANSMISSION

Ernest E. Wemp, Detroit, Mich., assignor of five per cent to Eleanor May Wemp, Los Angeles, Calif., five per cent to Leah Kathleen Smith, five per cent to Clyde J. Smith and twenty per cent to Lila A. Wemp, all of Detroit, Mich.

Application November 29, 1944, Serial No. 565,639

7 Claims. (Cl. 192—53)

This invention relates to a power coupling in a torque transmitting line for making and breaking a torque transmitting coupling between driving and driven members.

The coupling is one which is operable to establish a dental engagement while both the driving member and the driven member are under torque load and the dental engagement is made substantially when the parts to be dentally engaged are synchronized. To this end, there is a shiftable coupling which has a slidable engagement with one member and which is arranged for dental engagement and disengagement with the other member. Means are provided, preferably, for causing a controlled axial shift of the coupling and the preferred arrangement embodies means tending to cause the coupling to shift into dental engagement. However, blocking means are provided for preventing the coupling from shifting into dental engagement while the member with which it is to become dentally engaged is rotating at a different speed. The blocking means is arranged to be released when the speeds become substantially synchronized. With this arrangement, it will be noted, that when the coupling is out of dental engagement with its cooperating member, it is blocked and held in the disengaged position. In an automotive vehicle, however, where this coupling may find an important use, it is desirable to have the dental engagement established under conditions other than that of substantially synchronous rotation. To this end the coupling enters into a combination with an automatic clutch which may be of the centrifugal type. The blocking means is so arranged as to be maintained in blocking relationship while the automatic clutch is engaged, in which condition both the driving member and the driven member are under torque load. However, when the automatic clutch disengages, one of the members of the coupling is freed from the torque load. This freedom permits of an operation of the blocking elements for movement of the coupling into a dentally engaged condition.

A structure for carrying out the invention is shown in the accompanying drawings and in considering the following detailed description in connection with the drawings, other objects and advantages will become appreciated.

Fig. 1 is a cross sectional view taken through a coupling and associated automatic clutch showing the coupling engaged and the clutch disengaged.

Fig. 2 is a view of the coupling similar to that shown in Fig. 1 but showing the coupling disengaged.

Fig. 3 is a detached elevational view of the coupler.

Fig. 4 is an end elevational view of the coupler.

Fig. 5 is an elevational view of a friction controlling member.

Fig. 6 is a side view of the friction controlling member.

Fig. 7 is a developed view illustrating the blocking means and the relationship of the coupler and friction controlling member when the parts are dentally engaged.

Fig. 8 is a developed view similar to Fig. 7 showing the relationship of the blocking elements when the coupling is forcibly held in disengaged position.

Fig. 9 is a view similar to Figs. 7 and 8 showing the blocking elements in blocking position.

In Fig. 1, the fly wheel of an engine, such as an internal combustion engine in an automotive vehicle is illustrated at 1, the fly wheel being mounted on the engine crank shaft and a centrifugal clutch structure is shown. This structure comprises a cover plate 2 mounted on the fly wheel and supporting a plurality of levers 3 pivoted to the cover plate as at 4. While only one lever is shown in Fig. 1, it is well appreciated by those versed in the art that there are several levers placed circumferentially about the cover plate. Each lever has an unbalanced centrifugal mass 5 and an arm 6 with a tip 7. Suitable control means which includes a bearing 8 may be employed for swinging the levers on their pivots for controlling the clutch. A pressure plate is illustrated at 9 and between the pressure plate and each lever is a strut 10, each of which extends through a suitable opening in the cover plate. A clutch driven disc 11 has suitable facings 12 disposed between the fly wheel and the pressure plate, and the driven disc has a hub 13 mounted upon a clutch shaft 15. The clutch shaft is a driving shaft in so far as the power coupling is concerned. The pressure plate may be normally retracted from the fly wheel by a plurality of circumferentially disposed springs 16, reacting on the cover plate and acting upon studs 17 which are connected to the pressure plate.

This centrifugal clutch is constructed and arranged so that it is normally disengaged at engine idling speeds. The engine may idle at about 500 or 600 R. P. M. and the clutch may engage at 700 or 800 R. P. M. upon acceleration and disengage at similar speeds upon deceleration. Supplemental control of the clutch may be obtained from the bearing 8 which, if applied to the lever tips by pressure, supplements the centrifugal packing pressure. This entire clutch arrangement, from a general standpoint, is known to those versed in the clutch art and need not be further disclosed.

The power coupling, as shown herein, is disposed between the clutch shaft 15 or driving member and the power input member of a gear change transmission. The power input member is the driven member of the power coupling. This member, as shown at 20, has a sleeve portion 21 which is journalled on the shaft 15 by suitable bearings 22 and 23, and is mounted in a bearing 24 disposed in a supporting wall 25 of the transmission housing. There is a driving member 28 mounted on the shaft 15 as at 29 and this member is formed in cup fashion and is provided with internal teeth 30. Mounted in the driving member 28 is a friction ring 31 having an internally coned friction face 32. This member is mounted so that it rotates with the driving member 28.

A coupling member 34 is slidably mounted on the sleeve portion 21 and, as shown in Fig. 2, the connection between the coupling and the sleeve 21 is comprised of helical splines 35. Thus, as the coupling shifts axially it has a turning or screw-like action on the driven member 20. This arrangement disposes the dentally engaging teeth 30 and the splines on the driven member at an angle helically relative to each other where the teeth are straight. The coupling has a circumferential groove 36 for the reception of the pins of a yoke 37, the yoke 37 being an operating member for causing axial movement of the coupler. The coupler has external teeth 40 arranged to be dentally engaged and disengaged with respect to the teeth 30 and the coupler is preferably provided with a bumper or stop of rubber or the like, as shown at 41, for abutting against the driving member 28 when the teeth are dentally engaged as shown in Fig. 1. The coupler is acted upon by a spring 45 which seats in a spring retainer 46 so that the coupler is normally urged toward engaged position.

The blocking means comprises inter-engaging elements associated respectively with the two members having the dentally engaging teeth, namely, the driving member 28 and the coupler 34. The coupler has projections or fingers 50 which are circumferentially arranged and spaced and, as illustrated, there are three of these projections. Each projection has an abutment shoulder 51 which is disposed in an inclined manner, as illustrated in Fig. 3. There is a blocking member or cone disposed within the friction ring 31, this member being of frusto-conical form, as shown in Fig. 6. The member is generally illustrated at 53 and it has a coned external friction face 54. The member is cut away to provide notches or passageways 55 for accommodating the projections 50. When in assembled form, as shown in Fig. 2, the projections 50 extend into the clearance ways 55. One edge of each clearance way is provided with an angularly disposed abutment shoulder 56 arranged to cooperate with a corresponding shoulder 51 on one of the projections. The blocking cone is acted upon by a spring 60 which reacts against the ends of the helical splines 35 on the driven member and urges the coned surface 54 into frictional engagement with the internal coned surface 32.

The operation of the structure may be appreciated by reference to the developed views in Figs. 7, 8 and 9. When the coupling is established as shown in Fig. 1, there is a positive connection between the driving member and the driven member considering these members as being the member 28 and the member 20. The normal direction of rotation may be considered as being clockwise, as Figs. 1 and 2 are viewed from the left and as shown by the arrows. The normal direction of rotation would be downward with respect to the sheet of drawings as Figs. 7, 8 and 9 are viewed. When the torque is delivered from the driving member 28 to the driven member 20 the axial thrust on the coupler, due to the helical splines, is to the left as Figs. 1 and 2 are viewed, thus causing the teeth 30 and 40 to tend to stay in engagement with each other and causing the bumper 41 to abut up against the driving member. When the torque reverses or, in other words, when the torque is delivered from the member 20 to the member 28, the thrust tends to shift the coupler to the right and so tends to reject the coupler. However, the preferred arrangement is that the thrust is overcome and it may be substantially balanced by the other loads on the coupler including the load on the dentally engaging teeth, the load on the spline coupling, the spring 45 and perhaps, the load effected by the control yoke 37. In the coupled condition the projections 50 extend into the clearance ways 55 in a manner substantially as shown in Fig. 7.

Let it be assumed that this coupled condition exists while a vehicle, for example, is operating in a normal fashion with the clutch engaged and the torque being transmitted through the coupling to the driven member. In the normal operation of the construction the accelerator of the engine will be released to cause the engine to decelerate and, at about the same time the control yoke 37 will be operated to shift the coupling to the right, or from the Fig. 1 position to the Fig. 2 position, thus breaking the dental connection. During the time interval, in which the straight teeth 30 and 40 are moving out of dental engagement with each other, the coupler must necessarily rotate in unison with the driving member but it has a turning or screw-like action on the driven member by reason of the helical splines. With the coupler thus held in disengaged position, the projections 50 and the associated clearance ways 55 may take a position substantially as illustrated in Fig. 8.

Since the accelerator of the engine has been released the engine decelerates rapidly whereas the driven member 20 and the coupler continue rotating substantially uniformly as determined by the speed of movement of the vehicle. The frictional engagement between the face 32 on the coupler and the face 54 on the abutment cone causes the cone to shift so that one wall of each clearance way engages the associated projection substantially at the point $x$, as shown in Fig. 8. The friction load between the cone and the coupler holds the cone in the position shown in Fig. 8 with the inclined shoulder 56 positioned in alignment with the inclined shoulder 51. At this time a shift of gears can be made in the gear change transmission (not shown) since the torque line has been broken; in other words, the engine has been disconnected from the driven parts. If, now, the controlling action of the yoke is released the spring 45 will push the coupler to the left toward dentally engaged position and the shoulders 51 abut the shoulders 56, the parts assuming a position as shown in Fig. 9. This blocks further movement of the coupler to the left and prevents an engagement of the teeth 30 and 40. This condition will be maintained so long as the engine and driving member 28 are rotating at a lower R. P. M. than the coupler and so long as the friction clutch remains engaged. Upon acceleration of the engine and, therefore, the driving member 28, the driving member may first be brought up to the speed of rotation of the coupler and then as it starts to turn faster than the coupler or, in other words, tends to overrun the coupler, the abutment cone 53, due to the frictional engagement between faces 54 and 32 starts to rotate with the driving member and shifts the abutting shoulders 56 out of blocking relationship with the shoulders 51 whereupon the spring 45 pushes the coupler to the left and causes a dental engagement. As the straight teeth 30 and 40 are sliding into full engagement the coupler is rotating in unison with the driving member 28 and it slightly overruns the driven member 20 as it moves on the helical splines. The coupling is finally established when the axial movement of the coupler is stopped by engagement of the bumper 41 with the driving member. Thus, under these conditions, the dental engagement is established only on substantial synchronization of the driving and driven members.

This coupler, however, is one which is arranged to be normally engaged in that it requires a load on the driving member to maintain a disengaged condition. In this connection there is a cooperative arrangement or function between the coupler and the automatic clutch. In the operation above described, it was assumed that the centrifugal clutch remained engaged even though the engine was decelerated below the R. P. M. of the driven member. When a condition exists as shown in Fig. 9, the force of the spring 45 acts through the inclined abutment shoulders 51 and 56 tending to shift the driving member 28 in a direction which would release the blocking engagement. This would be a downward direction of the abutment cone 53, as Figs. 7, 8 and 9 are viewed. But so long as the clutch is engaged, the force cannot overcome the engine and, therefore, the coupling remains blocked out of dental engagement. However, if the engine is decelerated to about its idling speed where the clutch becomes automatically disengaged, then the driving member 28, the clutch shaft 15 and the driven disc 11 of the clutch are released from the engine and released from the torque load thereof. The term "torque load," as used in this connection and in the appended claims, has reference to the torque delivered to the coupling by the engine or the traction wheels of the vehicle and is intended to distinguish from a torque load incident to the inertia or angular momentum of the parts. Under these conditions, the spring 45 is strong enough to push the coupler 34 to the left and the now free driving member is caused to turn by the camming out by the inclined abutment faces 51 and 56 with the result that the coupler is shifted into dental engagement with the driving member. Accordingly, any time the vehicle is stopped or parked and the engine decelerated to idling speed or its operation discontinued, the coupling becomes engaged.

In the normal operation of a vehicle equipped with the invention, there normally will be only one break or disconnection in the torque transmission line substantially at any given time. If the coupler 34 is disengaged from the member 28 the friction clutch must be engaged. As soon as the friction clutch becomes disengaged the coupler becomes engaged. The control 8 may be used to cause engagement of the friction clutch independently of centrifugal force. Accordingly, if the vehicle is to be left standing with its engine at rest, the clutch may be engaged by the swinging of the clutch levers through the means of the control 8 and the engine thereby coupled to the traction wheels. Furthermore, in the case of a stalled engine the vehicle may be pushed or towed and the engine may be started by engaging the clutch through the control bearing 8. Also, the centrifugally obtained clutch packing force may be supplemented by force applied by the control member 8.

I claim:

1. A torque transmitting mechanism comprising, a driving member, a driven member, a coupler, splines connecting the coupler to one member for axial movement of the coupler, teeth on the coupler and on the other member arranged to be brought into and out of dental engagement by axial shift of the coupler, the splines and the teeth being angularly disposed helically relative to each other, means acting on the coupler urging it axially toward dentally engaged position, blocking means on the coupler including abutment surfaces, blocking means associated with the toothed member including abutment surfaces, some of said abutment surfaces being inclined, said abutment surfaces arranged to engage each other to block the coupler in dentally disengaged position when the driving and driven members are under torque load and are rotating at different speeds, the blocking means being operable, when the driving and driven members become substantially synchronized, to disengage the abutment surfaces for dental engagement of the teeth, the inclined surfaces, under the load of the means which urges the coupler axially, being arranged to rock the one member relative to the other member when one member is released from torque load for disengagement of the abutment surfaces and movement of the coupler into dentally engaged position.

2. A torque transmitting mechanism comprising, a driving member, a driven member, a coupler, helical splines connecting the coupler with the driven member for axial movement of the coupler, teeth on the driving member and on the coupler arranged to be brought into and out of dental engagement by axial shift of the coupler, means acting on the coupler urging it axially toward dentally engaged position with the driving member, blocking means on the coupler including abutment surfaces, blocking means associated with the driving member including abutment surfaces, some of said abutment surfaces being inclined, said abutment surfaces arranged to engage each other to block the coupler in dentally disengaged position when the driving and driven members are under torque load and when the driving member is rotating slower than the driven member, the blocking means being operable when the driving member starts to over run the driven member to disengage the abutment surfaces for dental engagement of the teeth, the inclined surfaces under the load of the means which urges the coupler axially being arranged to rock the driving member relative to the driven member when the driving member is released from torque load for disengagement of the abutment surfaces and movement of the coupler into dentally engaged position.

3. A torque transmitting mechanism comprising, a driving member, a driven member, a coupler, means mounting the coupler on one member for axial movement, teeth on the other member and teeth on the coupler arranged to be brought into and out of dental engagement by the axial shift of the coupler, yieldable means normally acting upon the coupler urging it axially toward dentally engaged position, control means for shifting the coupler axially against the yieldable means to disengage the teeth, blocking means including blocking elements on the coupler and blocking elements associated with the toothed member, said elements arranged to abut each other and including inclined abutment surfaces arranged to block the coupler in dentally disengaged position when the driving and driven members are under torque load and are operating at different speeds, the blocking elements associated with the toothed member being operable by said toothed member to release the blocking action when the speeds of rotation of the driving and driven members become substantially synchronized, the inclination of the faces and the force of the said yieldable means being so co-ordinated that when one of the members is released from torque load the coupler is shifted by the yieldable means to dentally engaged position.

4. In combination, a primary driving member, a secondary driving member, an automatically acting clutch between the said driving members, a coupling comprising a driving member connected to the secondary driving member, a coupling driven member, a coupler, means mounting the coupler on one coupling member for axial movement, teeth on the other coupling member and teeth on the coupler arranged to be brought into and out of dental engagement by axial shift of the coupler, means acting by the coupler urging it axially toward dentally engaged position, blocking means including blocking elements on the coupler and blocking elements associated with the toothed coupling member, said blocking elements including abutting surfaces some of which are inclined, said blocking means being arranged and constructed to block the coupler in dentally disengaged position when the driving and driven members of the coupling are under torque load and are operating at different speeds, and operable to release the blocking action when the driving and driven members of the coupling become substantially synchronized, the angle of the inclined abutting faces and the force of the said means which urges the coupler toward dentally engaged position being so co-ordinated that upon disengagement of the automatic clutch between the primary driving member and secondary driving member, the then freed secondary driving member is rocked relative to the driven member of the coupling to disengage the blocking action for movement of the coupler into dentally engaged position.

5. In combination, a primary driving member, a secondary driving member, a centrifugal clutch between the members arranged to be engaged at above a substantially predetermined R. P. M. and to be disengaged below substantially the predetermined R. P. M., a coupling comprising a driving member connected to the secondary driving member, a coupling driven member, a coupler, means mounting the coupler on one coupling member for axial movement, teeth on the other coupling member and teeth on the coupler arranged to be brought into and out of dental engagement by axial shift of the coupler, means acting on the coupler to urge it axially toward dentally engaged position, blocking elements on the coupler, blocking elements associated with the toothed coupling member, said elements including surfaces some of which are inclined, arranged to abut and block the coupler in dentally disengaged position when the driving member and driven members of the coupling are under torque load and when the coupling driving member is operating at a lower R. P. M. than the coupling driven member, the blocking elements being shiftable out of blocking relationship when the coupling driving member starts to overrun the coupling driven member for movement of the coupler to dentally engaged position, the means which urges the coupler axially and the angle of the surfaces of the blocking elements being so co-ordinated that when the centrifugal clutch becomes disengaged, the thus freed primary driving member is rocked by the caming action of the inclined faces and the blocking action released for movement of the coupler to dentally engaged position.

6. In combination, a primary driving member, a centrifugal clutch arranged to automatically engage and disengage as the primary driving member is accelerated and decelerated, a clutch shaft driven upon engagement of the clutch, a power coupling comprising a driving member connected to the clutch shaft, a driven member, a coupler, helical splines connecting the coupler and the driven member for axial movement of the coupler, teeth on the driving member and coupler arranged for dental engagement and disengagement upon axial movement of the coupler on its splines, control means for shifting the coupler to break the dental engagement, a spring acting upon the coupler urging it toward dentally engaged position, blocking elements on the coupler, a blocking ring frictionally associated with the driving member, blocking elements thereon, some of said blocking elements being inclined said blocking elements arranged to abut each other and block the coupler in dentally disengaged position when the driving member is underriding the driven member and when the centrifugal clutch is engaged, said blocking elements being disengageable from each other as the driving member starts to overrun the driven member for movement of the coupler to dentally engaged position, the inclined blocking elements and the spring being so coordinated that the driving member and clutch shaft are turned relative to the driven member when the clutch becomes disengaged for movement of the coupler to dentally engaged position.

7. A power coupling comprising, a driving member, a driven member, a coupler, helical splines mounting the coupler on the driven member for axial movement, teeth on the driving member and teeth on the coupler arranged for dental engagement and disengagement upon axial shift of the coupler, means for moving the coupler to dentally disengaged position, a spring acting upon the coupler urging it toward dentally engaged position, blocking elements on the coupler, a blocking ring frictionally associated with the driving member, blocking elements on the blocking ring, some of said blocking elements being inclined, said blocking elements being arranged to abut each other and block the coupler in dentally disengaged position when the driving and driven members are under torque load and when the driving member is underriding the driven member, the blocking ring being movable with the driving member as the driving member starts to override the driven member to disengage the blocking elements for movement of the coupler to dentally engaged position, the spring and the inclined blocking elements being so coordinated and arranged that when the driving member is freed of torque load it is rocked by the action of the inclined elements for disalignment of the blocking elements and movement of the coupler to dentally engaged position.

ERNEST E. WEMP.

REFERENCES CITED

The following references are of record in the file of this patent:

UNITED STATES PATENTS

| Number | Name | Date |
| --- | --- | --- |
| 1,836,773 | Salerni | Dec. 5, 1931 |
| 1,985,127 | Wemp | Dec. 18, 1934 |
| 2,077,487 | Lyman | Apr. 20, 1937 |
| 2,129,366 | Swennes | Sept. 6, 1938 |
| 2,256,308 | Bixley et al. | Sept. 16, 1941 |
| 2,369,842 | Meracher et al. | Feb. 20, 1945 |
| 2,397,344 | Fishburn | Mar. 26, 1946 |